US012138915B2

(12) United States Patent
Yoshida et al.

(10) Patent No.: US 12,138,915 B2
(45) Date of Patent: Nov. 12, 2024

(54) LIQUID JET HEAD AND LIQUID JET RECORDING DEVICE

(71) Applicant: SII Printek Inc., Chiba (JP)

(72) Inventors: Kensuke Yoshida, Chiba (JP); Akihiro Itagi, Chiba (JP)

(73) Assignee: SII PRINTEK INC., Chiba (JP)

( * ) Notice: Subject to any disclaimer, the term of this patent is extended or adjusted under 35 U.S.C. 154(b) by 148 days.

(21) Appl. No.: 18/169,453

(22) Filed: Feb. 15, 2023

(65) Prior Publication Data

US 2023/0256733 A1 Aug. 17, 2023

(30) Foreign Application Priority Data

Feb. 17, 2022 (JP) ................................ 2022-022754

(51) Int. Cl.
*B41J 2/045* (2006.01)

(52) U.S. Cl.
CPC ....... *B41J 2/04541* (2013.01); *B41J 2/04586* (2013.01)

(58) Field of Classification Search
CPC .. B41J 2/04541; B41J 2/04548; B41J 2/0457; B41J 2/04501
See application file for complete search history.

(56) References Cited

U.S. PATENT DOCUMENTS 8,654,166 B2 * 2/2014 Kamatani .......... H03K 19/0175 347/237
2018/0288276 A1 * 10/2018 Sato ..................... B41J 2/04563
2018/0345658 A1 * 12/2018 Shimono ................ B41J 2/0459

FOREIGN PATENT DOCUMENTS

JP 2018-167466 A 11/2018

* cited by examiner

*Primary Examiner* — Scott A Richmond
(74) *Attorney, Agent, or Firm* — Crowell & Moring LLP

(57) ABSTRACT

There are provided a liquid jet head and so on capable of enhancing the reliability. A liquid jet head according to an embodiment of the present disclosure includes a jet section configured to jet liquid, at least one drive circuit configured to output a drive signal used to jet the liquid to the jet section, a differential input line configured to transmit data from an outside of the liquid jet head toward the drive circuit, a differential output line configured to transmit data from the drive circuit toward the outside of the liquid jet head, a coupling part which is arranged between the outside of the liquid jet head and the drive circuit, and to which the differential input line and the differential output line are individually coupled, and a detection circuit configured to perform detection of a coupling state in the coupling part using a transmission signal in at least one of the differential output line and the differential input line.

9 Claims, 11 Drawing Sheets

FIG. 6

| PIN NUMBER | TERMINAL NAME | INPUT/OUTPUT | DESCRIPTION |
|---|---|---|---|
| 1 | GND | — | DIGITAL GROUND |
| 2 | Tin1_Data_p | I/O | FIRST INPUT TERMINAL Tin1/DIFFERENTIAL SIGNAL p/FOR DATA |
| 3 | Tin1_Data_n | I/O | FIRST INPUT TERMINAL Tin1/DIFFERENTIAL SIGNAL n/FOR DATA |
| 4 | GND | — | DIGITAL GROUND |
| 5 | Tin1_Clk_p | I/O | FIRST INPUT TERMINAL Tin1/DIFFERENTIAL SIGNAL p/FOR CLOCK |
| 6 | Tin1_Clk_n | I/O | FIRST INPUT TERMINAL Tin1/DIFFERENTIAL SIGNAL n/FOR CLOCK |
| 7 | GND | — | DIGITAL GROUND |
| ⋮ | ⋮ | ⋮ | ⋮ |
| 21 | GND | — | DIGITAL GROUND |
| 22 | Tin2_Clk_n | I/O | SECOND INPUT TERMINAL Tin2/DIFFERENTIAL SIGNAL n/FOR CLOCK |
| 23 | Tin2_Clk_p | I/O | SECOND INPUT TERMINAL Tin2/DIFFERENTIAL SIGNAL p/FOR CLOCK |
| 24 | GND | — | DIGITAL GROUND |
| 25 | Tin2_Data_n | I/O | SECOND INPUT TERMINAL Tin2/DIFFERENTIAL SIGNAL n/FOR DATA |
| 26 | Tin2_Data_p | I/O | SECOND INPUT TERMINAL Tin2/DIFFERENTIAL SIGNAL p/FOR DATA |
| 27 | GND | — | DIGITAL GROUND |

COMPARATIVE EXAMPLE 1

COMPARATIVE EXAMPLE 1

COMPARATIVE EXAMPLE 2

COMPARATIVE EXAMPLE 3

MODIFIED EXAMPLE

LIQUID JET HEAD AND LIQUID JET RECORDING DEVICE

RELATED APPLICATIONS

This application claims priority to Japanese Patent Application No. 2022-022754, filed on Feb. 17, 2022, the entire content of which is incorporated herein by reference.

BACKGROUND OF THE INVENTION

1. Field of the Invention

The present disclosure relates to a liquid jet head and a liquid jet recording device.

2. Description of the Related Art

Liquid jet recording devices equipped with liquid jet heads are used in a variety of fields, and a variety of types of liquid jet heads are developed (see, e.g., JP2018-167466A).

In such a liquid jet head, in general, it is required to increase the reliability.

It is desirable to provide a liquid jet head and a liquid jet recording device capable of increasing the reliability.

SUMMARY OF THE INVENTION

A liquid jet head according to an embodiment of the present disclosure includes a jet section configured to jet liquid, at least one drive circuit configured to output a drive signal used to jet the liquid to the jet section, a differential input line configured to transmit data from an outside of the liquid jet head toward the drive circuit, a differential output line configured to transmit data from the drive circuit toward the outside of the liquid jet head, a coupling part which is arranged between the outside of the liquid jet head and the drive circuit, and to which the differential input line and the differential output line are individually coupled, and a detection circuit configured to perform detection of a coupling state in the coupling part using a transmission signal in at least one of the differential output line and the differential input line.

A liquid jet recording device according to an embodiment of the present disclosure includes the liquid jet head according to the embodiment of the present disclosure.

According to the liquid jet head and the liquid jet recording device related to an embodiment of the present disclosure, it becomes possible to enhance the reliability.

BRIEF DESCRIPTION OF THE DRAWINGS

FIG. 6 is a diagram showing a configuration example of a pin arrangement in a coupling terminal part shown in FIG. 4A, FIG. 4B, and FIG. 5.

DETAILED DESCRIPTION OF THE PREFERRED EMBODIMENTS

An embodiment of the present disclosure will hereinafter be described in detail with reference to the drawings. It should be noted that the description will be presented in the following order:

1. Embodiment (an example of detecting a coupling state using a transmission signal of a differential output line)
2. Modified Example (an example of detecting a coupling state using a transmission signal of a differential output line/a differential input line)
3. Other Modified Examples

1. Embodiment

[Outline Configuration of Printer 5]

Figure 1:
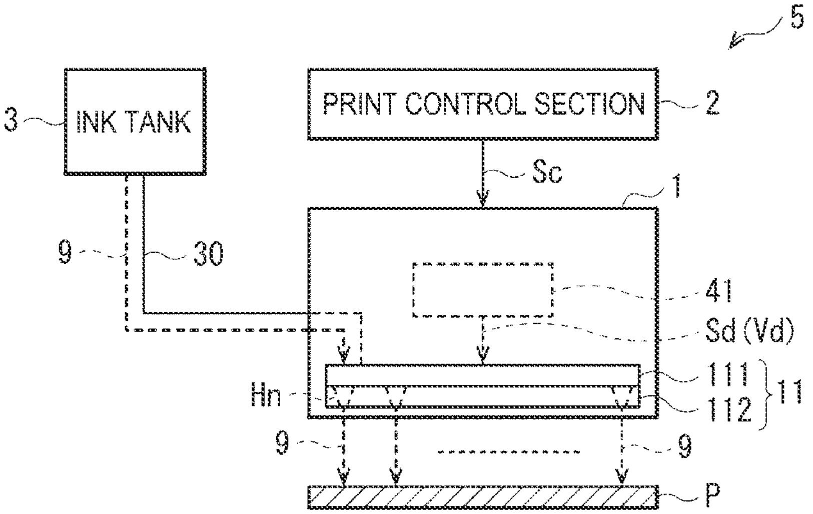
FIG. 1 is a block diagram showing an outline configuration example of a liquid jet recording device according to an embodiment of the present disclosure.
Figure 2:
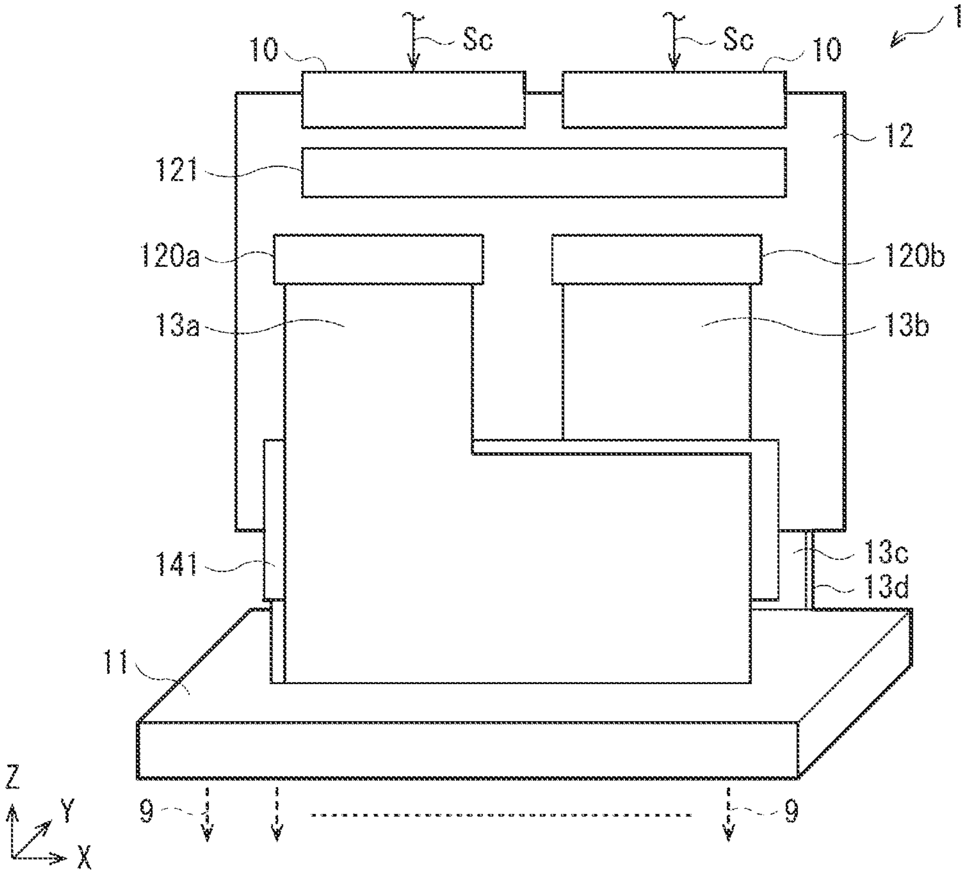
FIG. 2 is a perspective view schematically showing an outline configuration example of a liquid jet head shown in FIG. 1.
Figure 3:
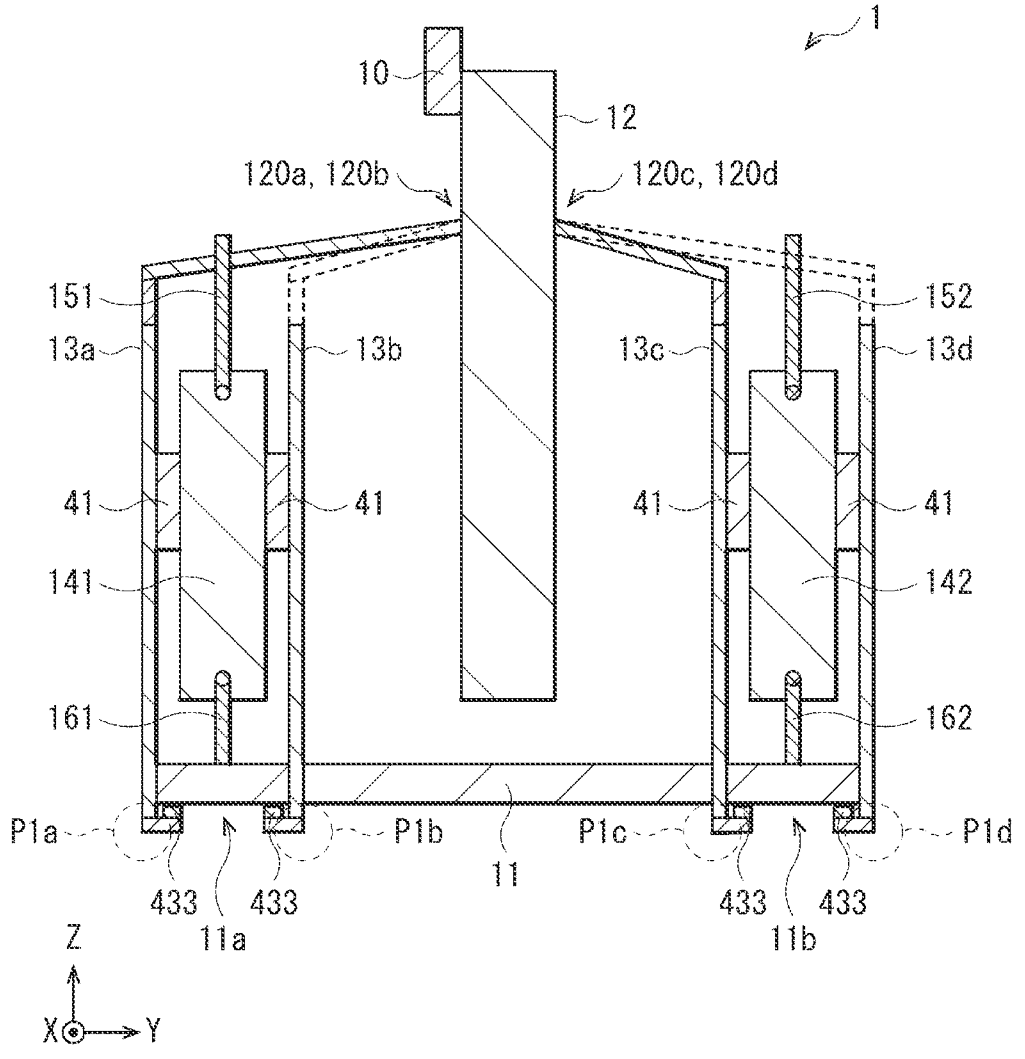
FIG. 3 is a cross-sectional view schematically showing a configuration example of the liquid jet head shown in FIG. 2.

FIG. 1 is a block diagram showing an outline configuration example of a printer 5 as a liquid jet recording device according to an embodiment of the present disclosure. FIG. 2 is a perspective view schematically showing an outline configuration example of an inkjet head 1 as a liquid jet head shown in FIG. 1. FIG. 3 is a cross-sectional view (a Y—Z cross-sectional view) schematically showing a configuration example of the inkjet head 1 shown in FIG. 2.

It should be noted that a scale size of each of the members is accordingly altered so that the member is shown in a recognizable size in the drawings used in the description of the present specification.

The printer 5 is an inkjet printer for performing recording (printing) of images, characters, and the like on a recording target medium (e.g., recording paper P shown in FIG. 1) using ink 9 described later. As shown in FIG. 1, the printer 5 is provided with the inkjet head 1, a print control section 2, and an ink tank 3.

It should be noted that the inkjet head 1 corresponds to a specific example of a "liquid jet head" in the present disclosure, and the printer 5 corresponds to a specific example of a "liquid jet recording device" in the present disclosure. Further, the ink 9 corresponds to a specific example of a "liquid" in the present disclosure.

(A. Print Control Section 2)

The print control section 2 is for supplying the inkjet head 1 with a variety of types of information (data). Specifically, as shown in FIG. 1, the print control section 2 is arranged to supply each of constituents (drive devices 41 described later and so on) in the inkjet head 1 with a print control signal Sc.

It should be noted that the print control signal Sc is arranged to include, for example, image data, an ejection timing signal, and a power supply voltage for making the inkjet head 1 operate. Further, the print control section 2 corresponds to a specific example of an "outside of a liquid jet head" in the present disclosure.

(B. Ink Tank 3)

The ink tanks 3 are each a tank for containing the ink 9 inside. As shown in FIG. 1, the ink 9 in the ink tank 3 is arranged to be supplied to the inside (a jet section 11 described later) of the inkjet head 1 via an ink supply tube 30. It should be noted that such an ink supply tube 30 is formed of, for example, a flexible hose having flexibility.

(C. Inkjet Head 1)

As represented by dotted arrows in FIG. 1, the inkjet head 1 is a head for jetting (ejecting) the ink 9 shaped like a droplet from a plurality of nozzle holes Hn described later to the recording paper P to thereby perform recording of images, characters, and so on. As shown in, for example, FIG. 2 and FIG. 3, the inkjet head 1 is provided with a single jet section 11, a single I/F (interface) board 12, four flexible boards 13*a*, 13*b*, 13*c*, and 13*d*, two cooling units 141, 142, two ink entrance parts 151, 152, and two ink introduction parts 161, 162.

(C-1. I/F Board 12)

As shown in FIG. 2 and FIG. 3, the I/F board 12 is a board relaying between an outside (the print control section 2) of the inkjet head 1 and the flexible boards 13*a*, 13*b*, 13*c*, and 13*d*. The I/F board 12 is provided with two connectors 10, four connectors 120*a*, 120*b*, 120*c*, and 120*d*, and a circuit arrangement area 121. It should be noted that such an I/F board 12 corresponds to a specific example of a "relay board" in the present disclosure.

As shown in FIG. 2, the connectors 10 are each a part (a connector part) for inputting the print control signal Sc which is described above, and which is supplied from the print control section 2 toward the inkjet head 1 (the flexible boards 13*a*, 13*b*, 13*c*, and 13*d* described later).

The connectors 120*a*, 120*b*, 120*c*, and 120*d* are parts (connector parts) for electrically coupling the I/F board 12 and the flexible boards 13*a*, 13*b*, 13*c*, and 13*d*, respectively.

The circuit arrangement area 121 is an area where a variety of circuits are arranged on the I/F board 12. It should be noted that it is also possible to arrange that such a circuit arrangement area is also disposed in other areas on the I/F board 12.

(C-2. Jet Section 11)

As shown in FIG. 1, the jet section 11 is a part which has the plurality of nozzle holes Hn, and which jets the ink 9 from these nozzle holes Hn. Further, in the example shown in FIG. 3, it is arranged that the ink 9 supplied via the ink entrance part 151 and the ink introduction part 161 is jetted from a jet part 11*a* in the jet section 11, and the ink 9 supplied via the ink entrance part 152 and the ink introduction part 162 is jetted from a jet part 11*b* in the jet section 11. Such jet of the ink 9 is arranged to be performed (see FIG. 1) in accordance with drive signals Sd (drive voltages Vd) supplied from the drive devices 41 described later on each of the flexible boards 13*a*, 13*b*, 13*c*, and 13*d*.

As shown in FIG. 1, such a jet section 11 is configured including an actuator plate 111 and a nozzle plate 112.

(Nozzle Plate 112)

The nozzle plate 112 is a plate formed of a film material such as polyimide, or a metal material, and has the plurality of nozzle holes Hn described above as shown in FIG. 1. These nozzle holes Hn are formed side by side at predetermined intervals, and each have, for example, a circular shape.

Specifically, in the example of the jet section 11 shown in FIG. 2, the plurality of nozzle holes Hn in the nozzle plate 112 are constituted by a plurality of nozzle arrays (four nozzle arrays) each arranged along a column direction (an X-axis direction). Further, these four nozzle arrays are arranged side by side along a direction (a Y-axis direction) perpendicular to the column direction.

(Actuator Plate 111)

The actuator plate 111 is a plate formed of a piezoelectric material such as PZT (lead zirconate titanate). The actuator plate 111 is provided with a plurality of channels (pressure chambers). These channels are each a part for applying pressure to the ink 9, and are arranged side by side so as to be parallel to each other at predetermined intervals. Each of the channels is partitioned with drive walls (not shown) formed of a piezoelectric body, and forms a groove part having a recessed shape in a cross-sectional view.

As such channels, there exist ejection channels for ejecting the ink 9, and dummy channels (non-ejection channels) which do not eject the ink 9. In other words, it is arranged that the ejection channels are filled with the ink 9 on the one hand, but the dummy channels are not filled with the ink 9 on the other hand.

It should be noted that it is arranged that filling of each of the ejection channels with the ink 9 is performed via, for example, a flow channel (a common flow channel) commonly communicated with such ejection channels. Further, it is arranged that each of the ejection channels is individually communicated with the nozzle hole Hn in the nozzle plate 112 on the one hand, but each of the dummy channels is not communicated with the nozzle hole Hn on the other hand. These ejection channels and the dummy channels are alternately arranged side by side along the column direction (the X-axis direction) described above.

Further, on the inner side surfaces opposed to each other in the drive wall described above, there are respectively disposed drive electrodes. As the drive electrodes, there exist common electrodes disposed on the inner side surfaces facing the ejection channels, and active electrodes (individual electrodes) disposed on the inner side surfaces facing the dummy channels. These drive electrodes and the drive devices 41 described later are electrically coupled to each other via each of the flexible boards 13*a*, 13*b*, 13*c*, and 13*d*. Thus, it is arranged that the drive voltages Vd (the drive signals Sd) described above are applied to the drive electrodes from the drive devices 41 via each of the flexible boards 13*a*, 13*b*, 13*c*, and 13*d* (see FIG. 1).

(C-3. Flexible Boards 13*a*, 13*b*, 13*c*, and 13*d*)

The flexible boards 13*a*, 13*b*, 13*c*, and 13*d* are each a board for electrically coupling the I/F board 12 and the jet section 11 to each other as shown in FIG. 2 and FIG. 3. It is arranged that these flexible boards 13*a*, 13*b*, 13*c*, and 13*d* individually control the jet actions of the ink 9 in the four nozzle arrays in the nozzle plate 112 described above, respectively. Further, as indicated by, for example, the reference symbols P1*a*, P1*b*, P1*c*, and P1*d* in FIG. 3, it is arranged that the flexible boards 13*a*, 13*b*, 13*c*, and 13*d* are folded around places (around clamping electrodes 433) where the flexible boards 13*a*, 13*b*, 13*c*, and 13*d* are coupled to the jet section 11, respectively. It should be noted that it is arranged that electrical coupling between the clamping electrodes 433 and the jet section 11 is achieved by, for example, thermocompression bonding using an ACF (Anisotropic Conductive Film).

It should be noted that these flexible boards 13*a*, 13*b*, 13*c*, and 13*d* each correspond to a specific example of a "drive board" in the present disclosure.

On each of such flexible boards 13*a*, 13*b*, 13*c*, and 13*d*, there are individually mounted the drive devices 41 (see FIG. 3). These drive devices 41 are each a device for outputting the drive signals Sd (the drive voltages Vd) for jetting the ink 9 from the nozzle holes Hn in the corresponding nozzle array in the jet section 11. Therefore, it is arranged that such drive signals Sd are output from each of the flexible boards 13*a*, 13*b*, 13*c*, and 13*d* to the jet section 11. It should be noted that such drive devices 41 are each formed of, for example, an ASIC (Application Specific Integrated Circuit).

Further, these drive devices 41 are arranged to be cooled by the cooling units 141, 142 described above. Specifically, as shown in FIG. 3, the cooling unit 141 is fixedly disposed between the drive devices 41 on the flexible boards 13*a*, 13*b*, and by pressing the cooling unit 141 against each of these drive devices 41, the drive devices 41 are cooled. Similarly, the cooling unit 142 is fixedly disposed between the drive devices 41 on the flexible boards 13*c*, 13*d*, and by pressing the cooling unit 142 against each of these drive devices 41, the drive devices 41 are cooled. It should be noted that such cooling units 141, 142 can each be configured using a variety of types of cooling mechanisms.

It should be noted that such a drive device 41 corresponds to a specific example of a "drive circuit" in the present disclosure.

[Detailed Configuration of Flexible Boards 13*a*, 13*b*, 13*c*, and 13*d*]

Subsequently, a detailed configuration example of the flexible boards 13*a*, 13*b*, 13*c*, and 13*d* described above will be described with reference to FIG. 4A, FIG. 4B, and FIG. 5 in addition to FIG. 1 to FIG. 3.

Figure 4A:
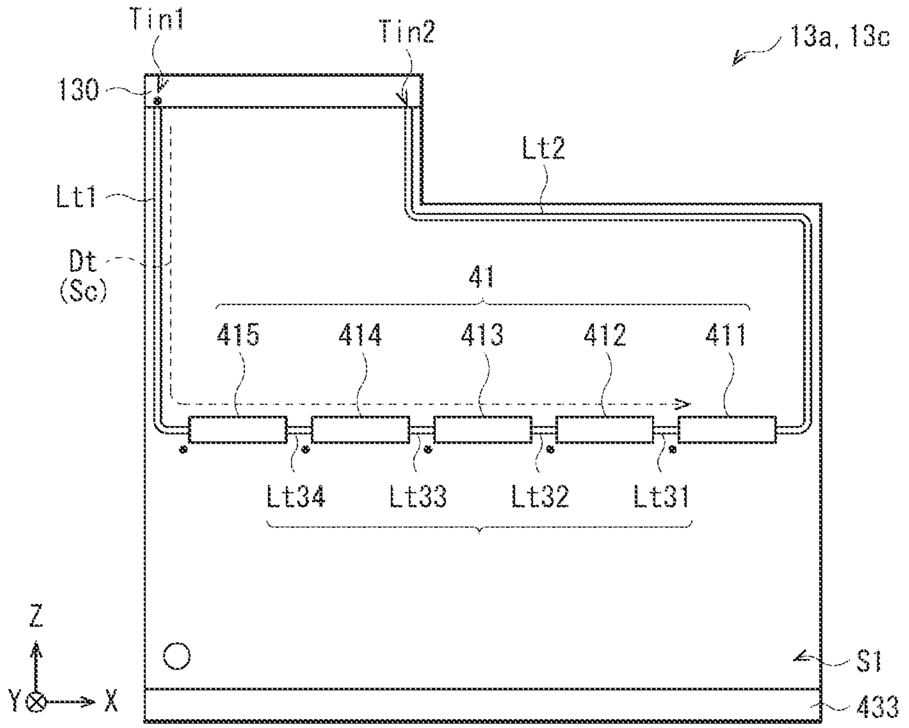
FIG. 4A is a plan view schematically showing a detailed configuration example of flexible boards shown in FIG. 2 and FIG. 3.
Figure 4B:
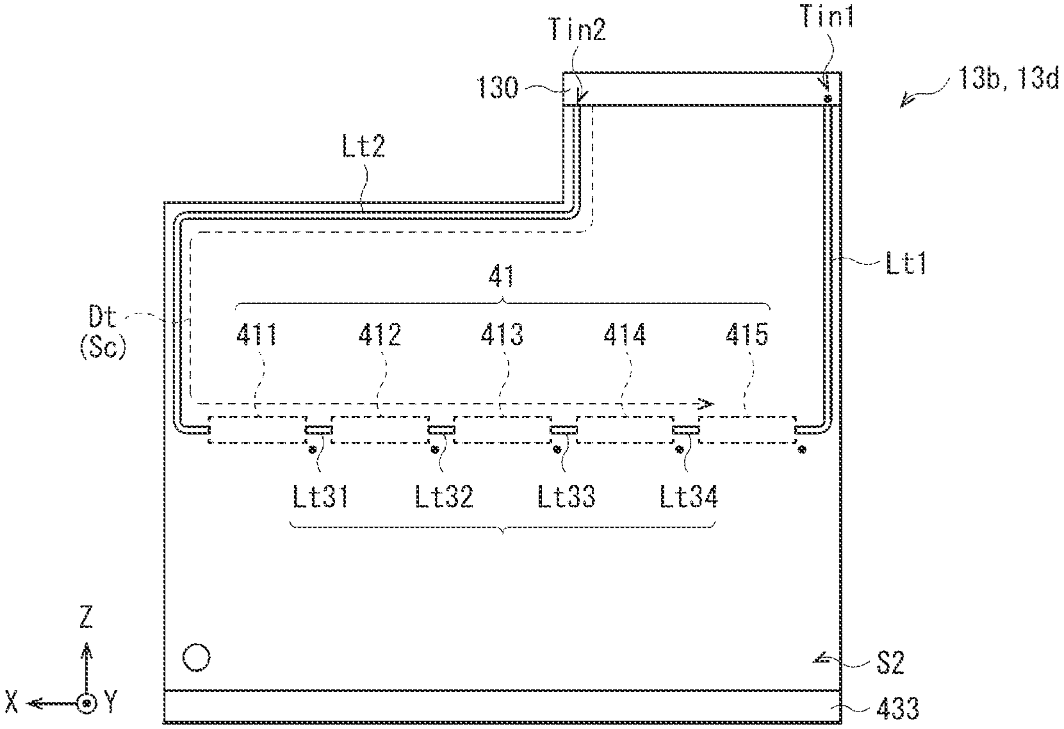
FIG. 4B is a plan view schematically showing a detailed configuration example of other flexible boards shown in FIG. 2 and FIG. 3.

FIG. 4A and FIG. 4B are plan views (Z—X plan views) schematically showing a detailed configuration example of the flexible boards 13*a* to 13*d* shown in FIG. 2 and FIG. 3. Specifically, FIG. 4A shows a planar configuration example (a Z—X planar configuration example) of the flexible boards 13*a*, 13*c*, and FIG. 4B shows a planar configuration example (a Z—X planar configuration example) of the flexible boards 13*b*, 13*d*. Further, FIG. 5 is a diagram schematically showing an arrangement configuration example of the members in the flexible boards 13*a*, 13*c* and so on shown in FIG. 4A.

First, as shown in each of FIG. 4A and FIG. 4B, the following members are provided to each of these flexible boards 13*a* to 13*d*. That is, there are provided a coupling terminal part 130, a first input terminal Tin1, a second input terminal Tin2, a first differential transmission line Lt1, a second differential transmission line Lt2, third differential transmission lines Lt31 to Lt34, the plurality of (five in this example) drive devices 41, and the clamping electrodes 433 described above.

Figure 5:
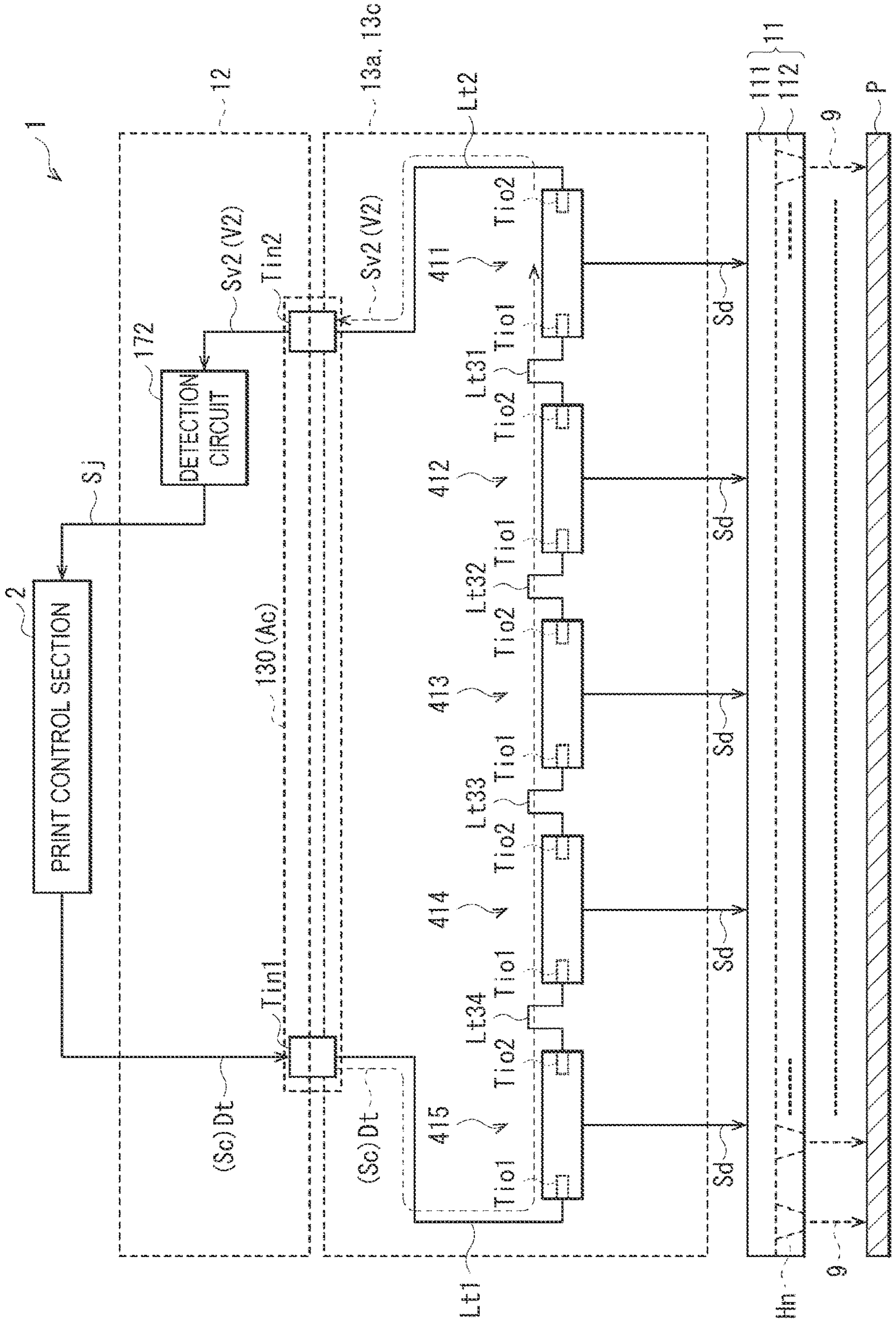
FIG. 5 is a schematic diagram showing an arrangement configuration example of members in the flexible board and so on shown in FIG. 4A.

As shown in each of FIG. 4A, FIG. 4B, and FIG. 5, the coupling terminal part 130 is arranged in an end part area at an I/F board 12 side in each of the flexible boards 13*a* to 13*d*. The coupling terminal part 130 includes a metal wiring terminal for electrically coupling each of the flexible boards 13*a* to 13*d* and the I/F board 12. Specifically, in this coupling terminal part 130, as shown in each of FIG. 4A, FIG. 4B, and FIG. 5, the first differential transmission line Lt1 and the second differential transmission line Lt2 as differential transmission lines described later are individually coupled. Further, as shown in FIG. 5, the coupling terminal part 130 has a coupling terminal area Ac including the first input terminal Tin1 and the second input terminal Tin2. The first input terminal Tin1 is arranged at one end part side of the coupling terminal area Ac, and the second input terminal Tin2 is arranged at the other end part side of the coupling terminal area Ac.

It should be noted that such a coupling terminal part 130 corresponds to a specific example of a "coupling part" in the present disclosure. Further, in the example shown in FIG. 5, the first input terminal Tin1 (to which the first differential transmission line Lt1 as a differential input line described later is coupled) corresponds to a specific example of a "first terminal" in the present disclosure. On the other hand, in the example shown in FIG. 5, the second input terminal Tin2 (to which the second differential transmission line Lt2 as the differential input line described later is coupled) corresponds to a specific example of a "second terminal" in the present disclosure.

It is arranged that transmission data Dt (the print control signal Sc described above) transmitted from the outside (the print control section 2 described above) of the inkjet head 1 is input to each of the first input terminal Tin1 and the second input terminal Tin2 described above (see FIG. 1, FIG. 2, FIG. 4A, and FIG. 4B). Further, as shown in FIG. 4A, FIG. 4B, and FIG. 5, the transmission data Dt is arranged to be transmitted from the print control section 2 via the differential transmission line (the first differential transmission line Lt1 or the second differential transmission line Lt2). Further, it is arranged that the transmission data Dt is transmitted to the inside of each of the flexible boards 13*a* to 13*d* via one of the first input terminal Tin1 and the second input terminal Tin2. Specifically, as shown in, for example, FIG. 4A and FIG. 5, it is arranged that in each of the flexible boards 13*a*, 13*c*, the transmission data Dt is transmitted to the inside of each of the flexible boards 13*a*, 13*c* via the first differential transmission line Lt1 and the first input terminal Tin1. Meanwhile, as shown in, for example, FIG. 4B, it is arranged that in each of the flexible boards 13*b*, 13*d*, the transmission data Dt is transmitted to the inside of each of the flexible boards 13*b*, 13*d* via the second differential transmission line Lt2 and the second input terminal Tin2.

Here, one of the first differential transmission line Lt1 and the second differential transmission line Lt2 is a differential transmission line (a differential input line) for transmitting data (transmission data Dt) from the outside (the print control section 2) of the inkjet head 1 toward each of the drive devices 41 as described above. On the other hand, the other of the first differential transmission line Lt1 and the second differential transmission line Lt2 is a differential transmission line (a differential output line) for transmitting data from each of the drive devices 41 toward the outside (the print control section 2) of the inkjet head 1.

The five drive devices 41 described above are mounted on each of the flexible boards 13*a* to 13*d* (at an obverse surface S1 side out of an obverse surface S1 and a reverse surface S2) in the example shown in FIG. 4A and FIG. 4B. As such five drive devices 41, in the example shown in FIG. 4A and FIG. 4B, there are disposed a single first drive device 411, a single second drive device 415, and three third drive devices 412 to 414. Further, these five drive devices 41 are disposed in series (cascaded) to each other between the first input terminal Tin1 and the second input terminal Tin2. Specifically, as shown in FIG. 4A and FIG. 4B, the second drive device 415, the third drive devices 414 to 412, and the first drive device 411 are arranged in series in this order from a side of the first input terminal Tin1 toward the second input terminal Tin2 in any of the flexible boards 13*a* to 13*d*. In other words, the second drive device 415 is located at one end of the serial arrangement of such drive devices 41, and at the same time, the first drive device 411 is located at the other end of this serial arrangement. Further, the plurality of (three in this example) third drive devices 414 to 412 are located between the second drive device 415 and the first drive device 411. Each of these five drive devices 41 is arranged to generate the drive signal Sd described above based on the transmission data Dt input via one of the first input terminal Tin1 and the second input terminal Tin2 as described above. It should be noted that the drive signals Sd generated in such a manner are arranged to be supplied toward the jet section 11 respectively via the clamping electrodes 433 described above on each of the flexible boards 13*a* to 13*d*.

Further, a plurality of differential transmission lines for transmitting the transmission data Dt via the five drive devices 41 arranged in series to each other are arranged between the first input terminal Tin1 and the second input terminal Tin2. Specifically, as shown in FIG. 4A and FIG. 4B, the first differential transmission line Lt1 is arranged between the first input terminal Tin1 and the second drive device 415, and the second differential transmission line Lt2 is arranged between the second input terminal Tin2 and the first drive device 411. Further, the third differential transmission line Lt31 is arranged between the first drive device 411 and the third drive device 412, and the third differential transmission line Lt32 is arranged between the third drive device 412 and the third drive device 413. The third differential transmission line Lt33 is arranged between the third drive device 413 and the third drive device 414, and the third differential transmission line Lt34 is disposed between the third drive device 414 and the second drive device 415.

It should be noted that such differential transmission lines (the first differential transmission line Lt1, the second differential transmission line Lt2, and the third differential transmission lines Lt31 to Lt34) are each formed using, for example, LVDS (Low Voltage Differential Signaling). It should be noted that it is possible for each of such differential transmission lines to be formed using, for example, CML (Current Mode Logic) or ECL (Emitter Coupled Logic).

Here, as described above, the input terminal (the first input terminal Tin1 or the second input terminal Tin2) to which the transmission data Dt is input is different (see FIG. 4A and FIG. 4B) between the flexible boards 13*a*, 13*c* and the flexible boards 13*b*, 13*d*. Further, in accordance therewith, the transmission direction inside the board of the transmission data Dt input is different between the flexible boards 13*a*, 13*c* and the flexible boards 13*b*, 13*d*. In other words, it is arranged that the transmission data Dt having been input from the first input terminal Tin1 is transmitted to the second drive device 415, the third drive devices 414, 413, and 412, and the first drive device 411 in this order (see FIG. 4A) in each of the flexible boards 13*a*, 13*c*. In contrast, it is arranged that the transmission data Dt having been input from the second input terminal Tin2 is transmitted to the first drive device 411, the third drive devices 412, 413, and 414, and the second drive device 415 in this order (see FIG. 4B) in each of the flexible boards 13*b*, 13*d*.

In such a manner, the input terminal to which the transmission data Dt is input and the transmission direction of the transmission data Dt are different between the flexible boards 13*a*, 13*c* and the flexible boards 13*b*, 13*d*. It should be noted that the flexible boards 13*a*, 13*c* and the flexible boards 13*b*, 13*d* are made the same in the structure of the substrate itself as each other, and the configurations of the flexible boards 13*a* to 13*d* are commonalized (shared) (see FIG. 4A and FIG. 4B). In other words, there is no need to prepare a plurality of types of flexible boards (drive boards) in accordance with the transmission direction of the transmission data Dt and so on, and it results in that there is disposed only a single type of flexible board (drive board) in the inkjet head 1.

[Detailed Configuration Example of Coupling Terminal Part 130]

Then, the detailed configuration example of the coupling terminal part 130 described above will be described with reference to FIG. 6. FIG. 6 shows a configuration example of a pin arrangement in the coupling terminal part 130. Specifically, in FIG. 6 described above, there is shown an example of a correspondence relationship of pin numbers of terminals included in the coupling terminal part 130, terminal names of the terminals, input/output directions in the terminals, and descriptions of the terminals. It should be noted that the arrangement position of the terminal with the pin number "1" shown in FIG. 6 corresponds to a position indicated by a filled circle in each of FIG. 4A and FIG. 4B. Further, in FIG. 6, the terminals with the pin numbers "8" to "20" are omitted from the illustration for the sake of convenience.

First, in high-speed differential transmission such as LVDS described above, basically, impedance control is performed by arranging the ground (GND) with a broad pattern in a layer opposed to a layer in which the differential transmission lines are arranged. Therefore, there is a restriction that it is difficult to arrange a component and so on in the portion where the differential transmission lines are arranged. Therefore, as shown in, for example, FIG. 4A and FIG. 4B, taking the horizontally-long shapes of the drive devices 41 cascaded with each other and the arrangement restriction of the differential lines into consideration, it results in that the arrangement positions of the differential transmission lines (the first differential transmission line Lt1 and the second differential transmission line Lt2) are set as follows. That is, it can be said that it is desirable for these differential transmission lines to be arranged around both ends of the board (each of the flexible boards 13*a* to 13*d*). Further, consequently, it results in that regarding a pin arrangement in the coupling terminal part 130, terminals corresponding to the differential signals are arranged around the both ends as shown in, for example, FIG. 6.

Here, in the example shown in FIG. 6, the terminals corresponding to the differential signals (for data, for clock) for the first input terminal Tin1, and the GND to the differential signals are as follows. It should be noted that "p" mentioned here means a p side ("+" side) in the lines of the differential signals, and "n" means an n side ("−" side) in the lines of the differential signals. Further, the input/output directions in the terminals of the respective differential signals are all described as "I/O," which means that the terminals can be used for both of Input and Output.

| |
|---|
| Pin number "1" ... "GND" (digital ground) |
| Pin number "2" ... "Tin1__Data__p" (Tin1/differential signal p/for data), I/O |
| Pin number "3" ... "Tin1__Data__n" (Tin1/differential signal n/for data), I/O |
| Pin number "4" ... "GND" (digital ground) |
| Pin number "5" ... "Tin1__Clk__p" (Tin1/differential signal p/for clock), I/O |
| Pin number "6" ... "Tin1__Clk__n" (Tin1/differential signal n/for clock), I/O |
| Pin number "7" ... "GND" (digital ground) |

In contrast, in the example shown in FIG. 6, the terminals corresponding to the differential signals (for data, for clock) for the second input terminal Tin2, and the GND to the differential signals are as follows.

| |
|---|
| Pin number "21" ... "GND" (digital ground) |
| Pin number "22" ... "Tin2__Clk__n" (Tin2/differential signal n/for clock), I/O |
| Pin number "23" ... "Tin2__Clk__p" (Tin2/differential signal p/for clock), I/O |
| Pin number "24" ... "GND" (digital ground) |
| Pin number "25" ... "Tin2__Data__n" (Tin2/differential signal n/for data), I/O |
| Pin number "26" ... "Tin2__Data__p" (Tin2/differential signal p/for data), I/O |
| Pin number "27" ... "GND" (digital ground) |

Here, when inserting the coupling terminal part 130 with such a pin arrangement into a connector (the connectors 120*a*, 120*b*, 120*c*, and 120*d* described above) to thereby achieve electrical coupling, such a wrong insertion as described below, for example, occurs in some cases.

Specifically, as such a wrong insertion, there are cited so-called "half-insertion state" and "oblique insertion state" as what is hard to be aware of the wrong insertion besides a mistaken insertion into the connector. The "half-insertion state" means a state in which the coupling terminal part 130 fails to reach contact points of the connector. On the other hand, the "oblique insertion state" means a state in which some of the terminals are electrically coupled while the rest of the terminals fail to be electrically coupled due to the fact that the coupling terminal part 130 is not horizontally inserted with respect to the contact points of the connector.

The mistaken insertion can easily be prevented by providing the connector with a wrong insertion preventing mechanism (e.g., a mechanism in which the connector is provided with a part fulfilling a relationship between a protruding part and a recessed part, and the insertion is inhibited unless the shapes fit each other). However, it is difficult to prevent the half-insertion state and the oblique insertion state described above using such a mechanism. In particular, regarding the oblique insertion state, since some of the terminals are electrically coupled, it superficially looks as if a normal operation were achieved, and therefore, the oblique insertion state is unnoticed in some cases.

Here, as a method of preventing such an oblique insertion state, it is conceivable to adopt a method of additionally arrange terminals (detection terminals) dedicated to detecting (confirming) a coupling state at, for example, both ends of the coupling terminal part 130. Specifically, it is arranged that the drive board side of the pin to be the detection terminal is coupled to the ground (GND), and the detection side is pulled up with the power supply voltage. Thus, when the normal coupling is achieved, the detection side is coupled to the ground to thereby be set to an "L" state, and therefore, by detecting the voltage at the detection side, it becomes possible to confirm whether or not the normal coupling is achieved.

However, when the terminals for the differential signals are arranged around the both ends of the coupling terminal part 130 as, for example, the pin arrangement shown in FIG. 6, it is not desirable to use, for example, the ground (GND) at the both ends (the pin numbers "1," "27") as the detection terminals from the viewpoint of impedance control. This is because, when using such ground terminals as the detection terminals, since a circuit at the detection side exists, even when the detection terminals are coupled to the ground, the detection terminals cannot be said to be the ground. Therefore, when, for example, the ground for the detection is additionally arranged at two terminals at the both ends, the two pins are added, it can be said that it is not desirable from the viewpoint of reduction in size and reduction in the number of lines or the like in the inkjet head 1.

[Configuration of Detection Circuit 172]

Then, a configuration example of a detection circuit 172 in the present embodiment for performing the detection of such a coupling state as described above in the coupling terminal part 130 will be described with reference to FIG. 7A to FIG. 7C in addition to FIG. 5 described above.

First, as shown in FIG. 5, the detection circuit 172 is arranged on the I/F board 12. Further, the detection circuit 172 performs the detection (confirmation) of the coupling state in the coupling terminal part 130 using a transmission signal (an output transmission signal Sv2) in the second differential transmission line Lt2 as the differential output line described above. Specifically, the detection circuit 172 is arranged to detect, for example, whether or not the I/F board 12 and each of the flexible boards 13*a* to 13*d* (the flexible boards 13*a*, 13*c* in the example shown in FIG. 5) are normally coupled to each other in the coupling terminal part 130.

Further, the detection circuit 172 is arranged to perform discrimination related to the coupling state based on a voltage (a voltage V2 of the output transmission signal Sv2) of such a transmission signal. In other words, it is arranged that the discrimination related to the coupling state is performed using the voltage V2 on the differential output line (the second differential transmission line Lt2) which is not used under normal conditions. Further, as shown in FIG. 5, the detection circuit 172 is arranged to output a coupling confirmation signal Sj representing the detection result of the coupling state in the coupling terminal part 130 to the outside (the print control section 2) of the inkjet head 1.

It should be noted that the output transmission signal Sv2 described above corresponds to a specific example of a "transmission signal (in the differential output line)" in the present disclosure.

Figure 7A:
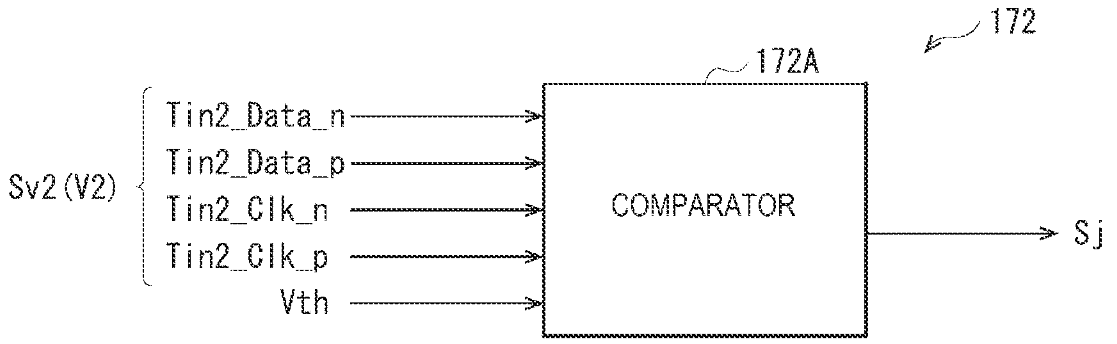
FIGS. 7A, 7B and 7C are a block diagram showing a configuration example of a detection circuit shown in FIG. 5.
Figure 7B:
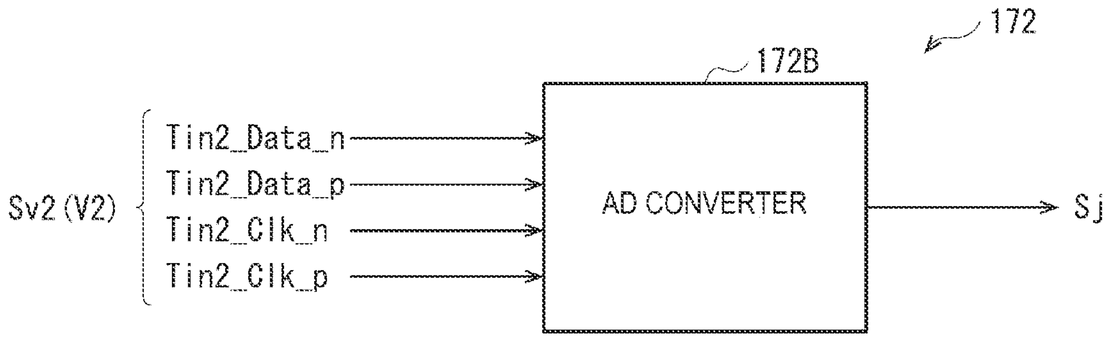
Figure 7C:
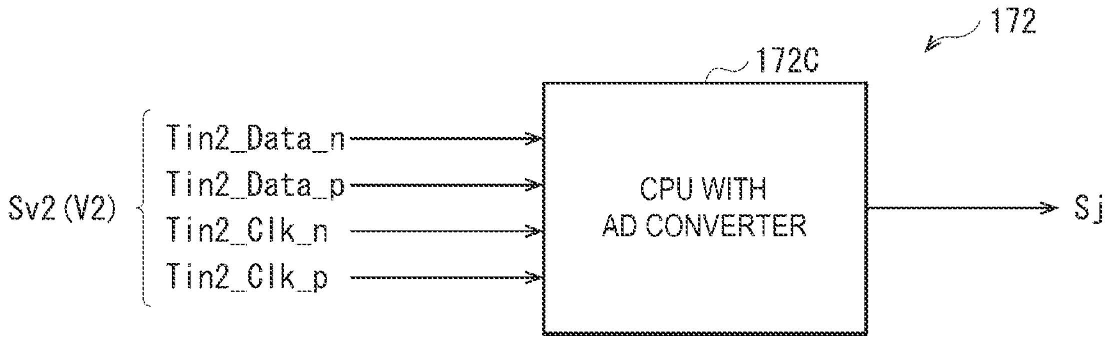

Here, FIG. 7A to FIG. 7C are a block diagram showing configuration examples of such a detection circuit 172. It should be noted that in the examples respectively shown in FIG. 7A to FIG. 7C, it is arranged that the output transmission signal Sv2 (the voltage V2) described above is input to the detection circuit 172 via the terminals (the terminal names: Tin2_Data_n, Tin2_Data_p, Tin2_Clk_n, and Tin2_Clk_p) with the pin numbers "2," "3," "5," and "6" described above.

First, in the example shown in FIG. 7A, the detection circuit 172 is configured including a comparator 172A. The comparator 172A compares the voltage V2 of the output transmission signal Sv2 with a predetermined threshold voltage Vth (e.g., a voltage around a common-mode voltage Vc described later) to thereby perform the discrimination related to the coupling state in the coupling terminal part 130. Specifically, the comparator 172A is arranged to determine whether or not the voltage V2 is no lower than the threshold voltage Vth, and then output the determination result as the coupling confirmation signal Sj (error output: a signal representing "H (High)" or "L (Low)") described above.

In contrast, in the example shown in FIG. 7B, the detection circuit 172 is configured including an AD (analog-digital) converter 172B. This AD converter 172B compares the voltage V2 of the output transmission signal Sv2 with a predetermined voltage range (e.g., a voltage range ΔVth around the common-mode voltage Vc described later) to thereby perform the discrimination related to the coupling state in the coupling terminal part 130. Specifically, when using the comparator 172A described above, the determination only on whether or not the voltage V2 is no lower than the threshold voltage Vth is performed, but when using this AD converter 172B, it is possible to determine whether or not the voltage V2 is within the predetermined voltage range. Therefore, when using the AD converter 172B, it becomes possible to make a more accurate determination on the discrimination related to the coupling state. It should be noted that it results in that the coupling confirmation signal Sj when using this AD converter 172B is output as digital data.

Further, in the example shown in FIG. 7C, the detection circuit 172 is configured including a CPU (Central Processing Unit) with AD converter 172C. This CPU with AD converter 172C compares the voltage V2 of the output transmission signal Sv2 with the predetermined voltage range to thereby perform the discrimination related to the coupling state in the coupling terminal part 130 similarly to the AD converter 172B described above. It should be noted that since the detection circuit 172 is the CPU, it results in that the coupling confirmation signal Sj when using the CPU with AD converter 172C is output as the error output similarly to when using the comparator 172A described above.

[Operations and Functions/Advantages]

(A. Basic Operation of Printer 5)

In the printer 5, a recording operation (a printing operation) of images, characters, and so on to the recording target medium (the recording paper P and so on) is performed using such a jet operation of the ink 9 by the inkjet head 1 as described below. Specifically, in the inkjet head 1 according to the present embodiment, the jet operation of the ink 9 using a shear mode is performed in the following manner.

First, the drive devices 41 on each of the flexible boards 13*a*, 13*b*, 13*c*, and 13*d* each apply the drive voltage Vd (the drive signal Sd) to the drive electrodes (the common electrode and the active electrode) described above in the actuator plate 111 in the jet section 11. Specifically, each of the drive devices 41 applies the drive voltage Vd to the drive electrodes disposed on the pair of drive walls partitioning the ejection channel described above. Thus, the pair of drive walls each deform so as to protrude toward the dummy channel adjacent to the ejection channel.

On this occasion, it results in that the drive wall makes a flexion deformation to have a V shape centering on the intermediate position in the depth direction in the drive wall. Further, due to such a flexion deformation of the drive wall, the ejection channel deforms as if the ejection channel bulges. As described above, due to the flexion deformation caused by a piezoelectric thickness-shear effect in the pair of drive walls, the volume of the ejection channel increases. Further, by the volume of the ejection channel increasing, the ink 9 is induced into the ejection channel as a result.

Subsequently, the ink 9 induced into the ejection channel in such a manner turns to a pressure wave to propagate to the inside of the ejection channel. Then, the drive voltage Vd to be applied to the drive electrodes becomes 0 (zero) V at the timing at which the pressure wave has reached the nozzle hole Hn of the nozzle plate 112 (or timing in the vicinity of that timing). Thus, the drive walls are restored from the state of the flexion deformation described above, and as a result, the volume of the ejection channel having once increased is restored again.

In such a manner, the pressure in the ejection channel increases in the process that the volume of the ejection channel is restored, and thus, the ink 9 in the ejection channel is pressurized. As a result, the ink 9 shaped like a droplet is ejected (see FIG. 1) toward the outside (toward the recording paper P) through the nozzle hole Hn. The jet operation (the ejection operation) of the ink 9 in the inkjet head 1 is performed in such a manner, and as a result, the recording operation of images, characters, and so on to the recording paper P is performed.

(B. Operation of Detecting Coupling State)

Then, the operation of detecting the coupling state (a detection operation by the detection circuit 172) in the coupling terminal part 130 in the inkjet head 1 according to the present embodiment will be described in detail in comparison with the comparative examples (Comparative Example 1 to Comparative Example 3).

First, in general in the inkjet head, it is very often the case that the plurality of boards is electrically coupled to each other using, for example, connectors or clamping connection inside (including outside) the inkjet head. In such a coupling portion, it is required to confirm whether or not the electrical coupling or the like is normal. For example, there is cited a method of confirming whether or not the receiving side normally receives data, and then, an electrical condition for normally receiving the data is continuously changed, and so on. Among those methods, as a simplified method for detecting (confirming) the coupling state between the boards, there can be cited, for example, the methods related to Comparative Example 1 to Comparative Example 3 described below.

(B-1. Comparative Example 1 to Comparative Example 3)

Figure 8A:
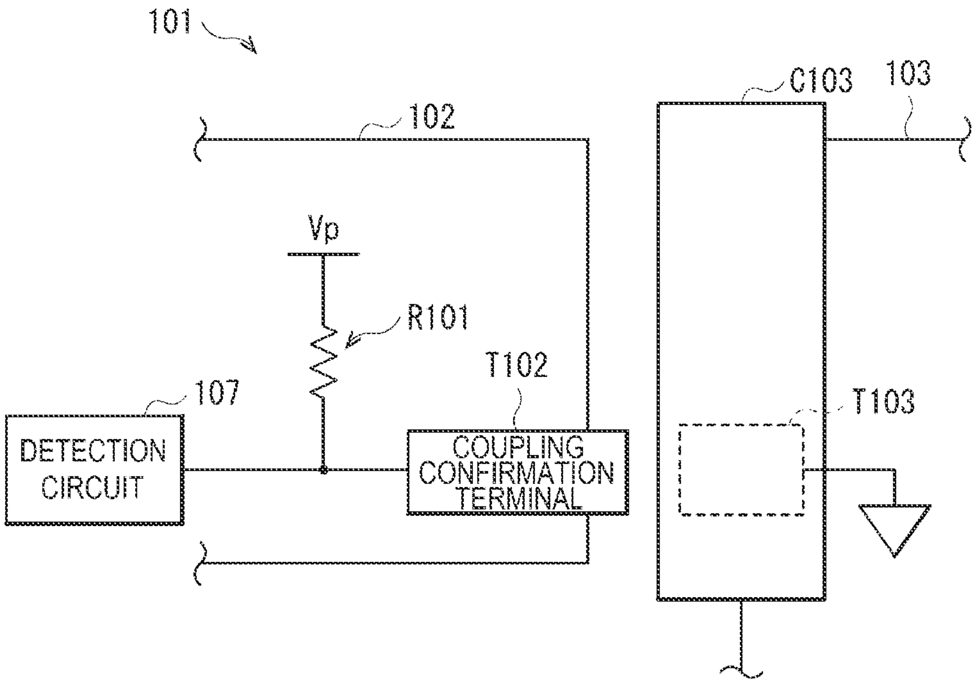
FIG. 8A is a schematic diagram for explaining a method of detecting a coupling state in a liquid jet head according to Comparative Example 1.
Figure 8B:
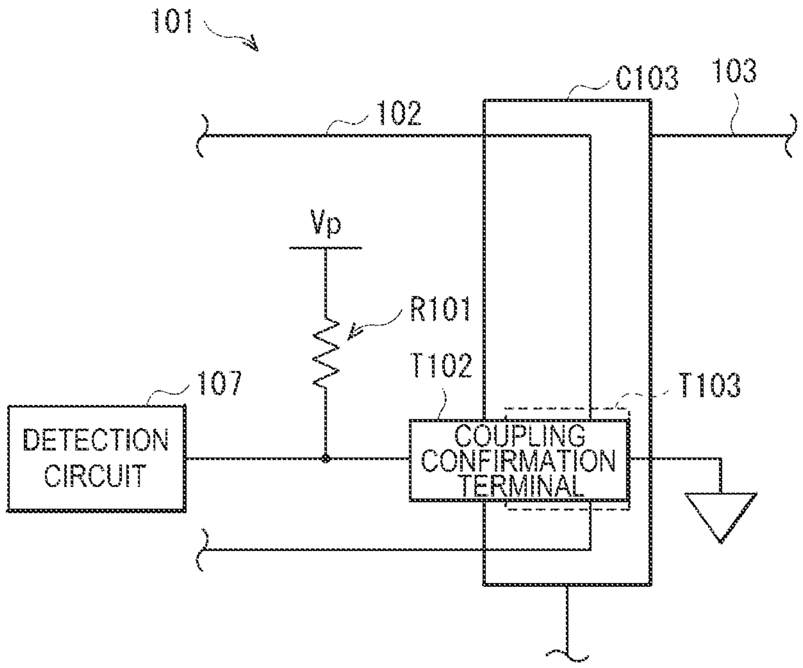
FIG. 8B is another schematic diagram for explaining the method of detecting the coupling state in the liquid jet head according to Comparative Example 1.

FIG. 8A and FIG. 8B are each a diagram schematically showing a method of detecting the coupling state in an inkjet head 101 related to Comparative Example 1.

As shown in FIG. 8A, in the inkjet head 101 according to Comparative Example 1, a detection circuit 107 is provided to a board 102 at an upstream side. Further, an input side (a coupling confirmation terminal T102 side) of this detection circuit 107 is coupled to a power supply voltage Vp via a pull-up resistor R101 of about several tens [kΩ]. In contrast, a coupling confirmation terminal T103 inside a connector C103 in a board 103 at the downstream side is coupled to the ground (=0 V). Here, as shown in FIG. 8A, the boards 102, 103 are not electrically coupled to each other via the connector C103, nothing is coupled to the coupling confirmation terminal T102, and therefore, a voltage equivalent to the power supply voltage Vp is input to the detection circuit 107. Therefore, in this state, it results in that the voltage at the "H" level is detected in the detection circuit 107.

In contrast, when the boards 102, 103 are electrically coupled to each other via the connector C103 as shown in FIG. 8B, the coupling confirmation terminal T102 is coupled to the ground on the board 103 via the connector C103 (the coupling confirmation terminal T103). Thus, since a potential (≈0 V) equivalent to the ground is input to the detection circuit 107, it results in that the voltage at the "L" level is detected in the detection circuit 107. In such a manner, in the method in Comparative Example 1, it becomes possible to detect the coupling state of the boards 102, 103 based on, for example, whether or not the voltage at the "L" level is detected in the detection circuit 107.

However, when applying the method in Comparative Example 1 to the differential transmission line (in the case of a method in Comparative Example 2 described below), the following problem can occur.

Figure 9A:
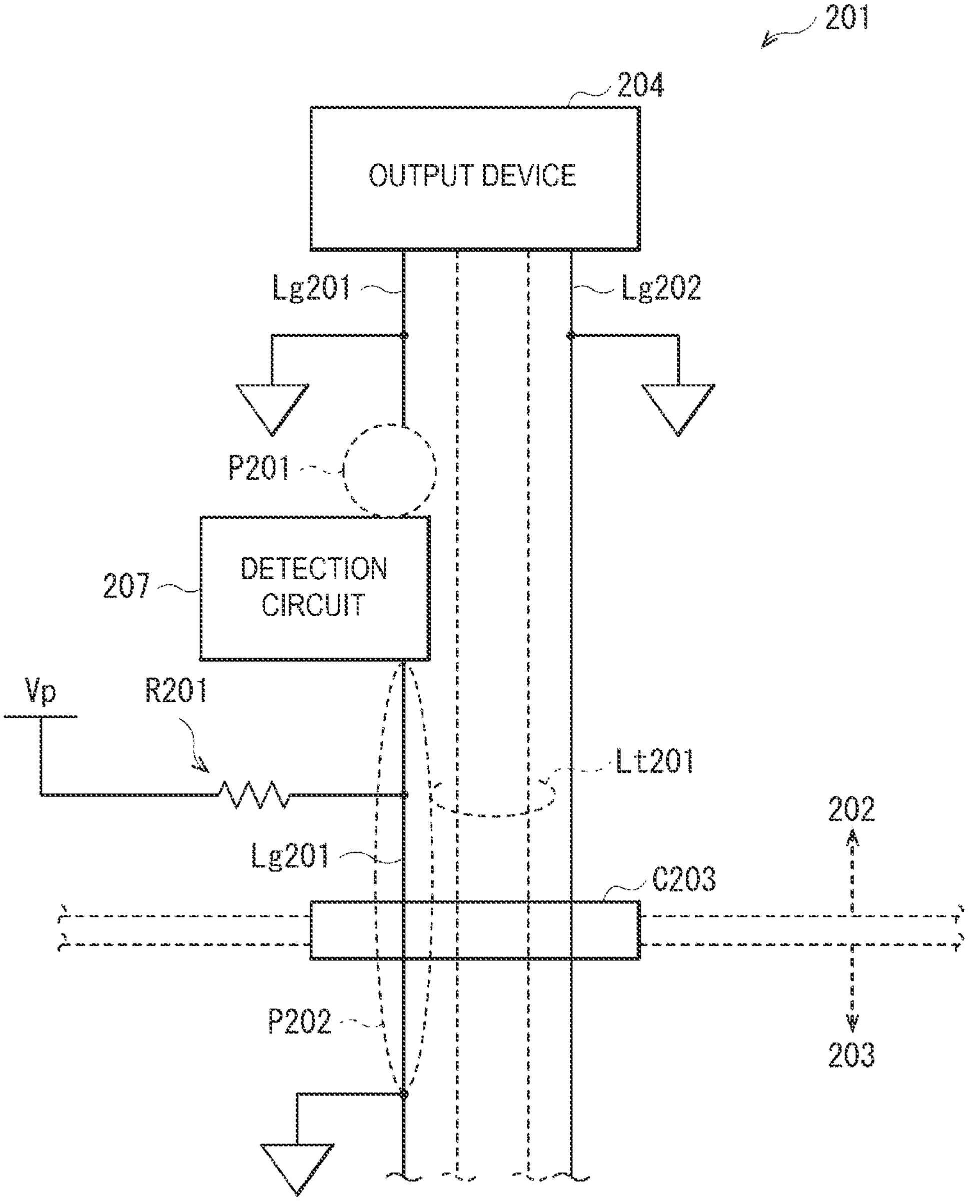
FIG. 9A is a schematic diagram for explaining a method of detecting a coupling state in a liquid jet head according to Comparative Example 2.

FIG. 9A is a diagram schematically showing a method of detecting the coupling state in an inkjet head 201 related to Comparative Example 2.

In the inkjet head 201 according to Comparative Example 2, a differential transmission line Lt201 is coupled to an output device 204 on a board 202, and it results in that this differential transmission line Lt201 is coupled up to a board 203 side via a connector C203. Further, at both ends of this differential transmission line Lt201, there are arranged ground lines Lg201, Lg202 for impedance control, respectively. Further, similarly to the case of Comparative Example 1 described above, an input side of a detection circuit 207 provided on the board 202 is coupled to the power supply voltage Vp via a pull-up resistor R201.

However, in the inkjet head 201 according to Comparative Example 2 described above, such a cut in the ground as denoted by, for example, a symbol P201 in FIG. 9A inevitably occurs between the output device 204 on the ground line Lg201 and the detection circuit 207. Further, as denoted by, for example, a symbol P202 in FIG. 9A, since the ground line Lg201 is coupled to the power supply voltage Vp via the pull-up resistor R201, it results in that it cannot be said that the ground line Lg201 is a genuine ground line. With these factors, it can be said that there is a possibility that the quality of the signal transmission deteriorates in the differential transmission line Lt201 on which the impedance control using the ground line Lg201 is performed.

Figure 9B:
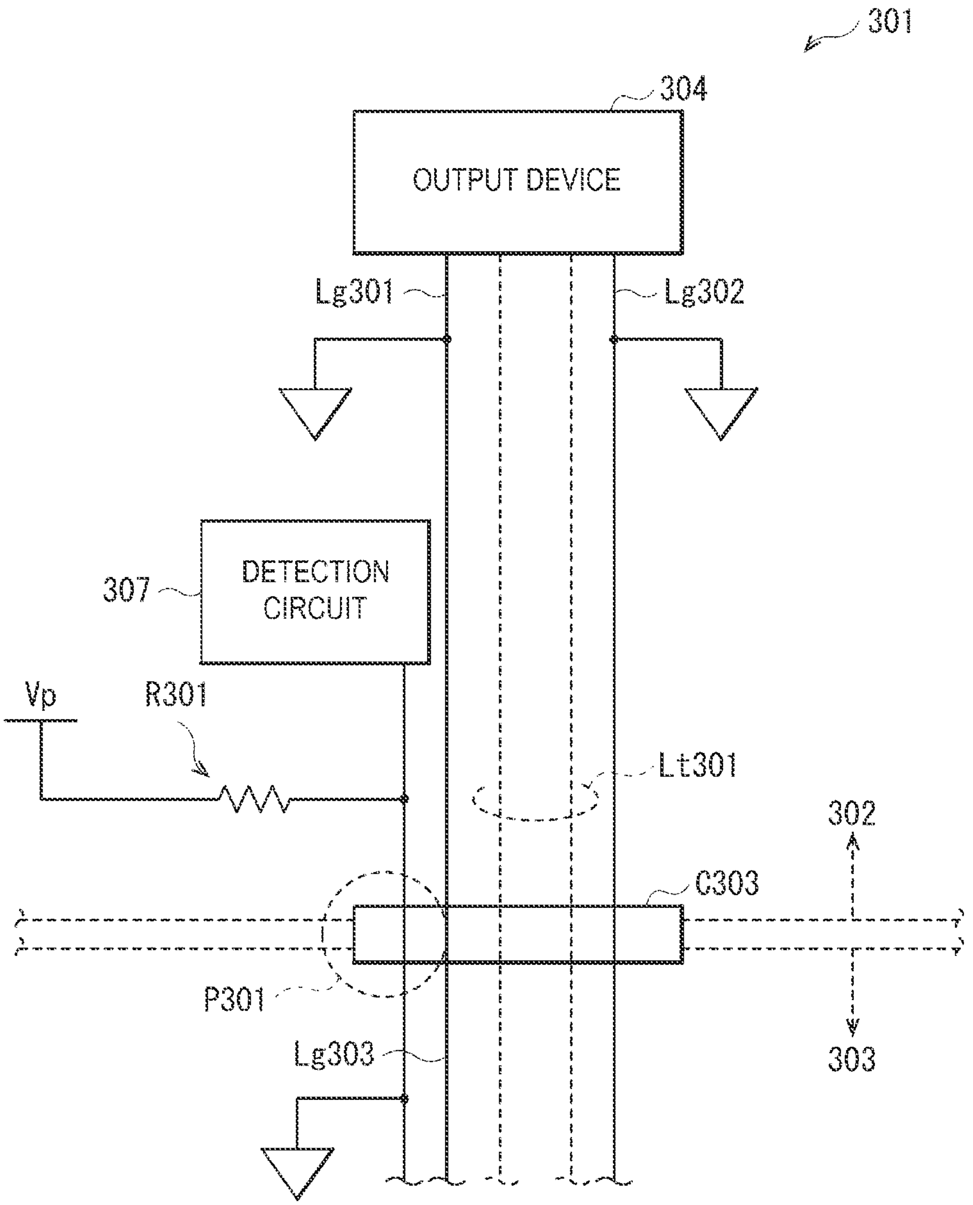
FIG. 9B is a schematic diagram for explaining a method of detecting a coupling state in a liquid jet head according to Comparative Example 3.

Further, FIG. 9B is a diagram schematically showing a method of detecting the coupling state in an inkjet head 301 related to Comparative Example 3.

In the inkjet head 301 according to Comparative Example 3, first, a differential transmission line Lt301 is coupled to an output device 304 on a board 302, and it results in that a differential transmission line Lt301 is coupled up to a board 303 side via a connector C303 similarly to the inkjet head 201 according to Comparative Example 2 described above. Further, at both ends of this differential transmission line Lt301, there are arranged ground lines Lg301, Lg302 for impedance control, respectively. In contrast, unlike the inkjet head 201, in the inkjet head 301, to an input side of a detection circuit 307 disposed on the board 302, there is coupled a ground line Lg303 which is separated from the ground lines Lg301, Lg302 described above, and which is dedicated to the coupling confirmation. Further, the input side of this detection circuit 307 is also coupled to the power supply voltage Vp via a pull-up resistor R301.

In the method in such Comparative Example 3, unlike the method in Comparative Example 2 described above, since the ground line Lg303 dedicated to the coupling confirmation is separately disposed, it results in that the quality deterioration of the signal transmission on the differential transmission line Lt301 is avoided. However, since a terminal dedicated to the coupling confirmation also becomes necessary in the connector C303 together with such a dedicated ground line Lg303 (see, e.g., an area denoted by a symbol P301 in FIG. 9B), the following problem can occur in the method in Comparative Example 3.

That is, the dedicated terminals described above become necessary, and accordingly, the coupling terminals for the power supply lines and the ground lines which become necessary for ensuring a stable operation and the reliability in the inkjet head 301 become impossible to be arranged in the inkjet head 301. In other words, since the number of such power supply lines and ground lines to be arranged decreases, it can be said that there is a possibility that the reliability of the inkjet head 301 deteriorates in Comparative Example 3 described above.

(B-2. Present Embodiment)

Therefore, in the inkjet head 1 according to the present embodiment, the detection (confirmation) of the coupling state in the coupling terminal part 130 is performed using the transmission signal (the output transmission signal Sv2) in the second differential transmission line Lt2 as the differential output line in the detection circuit 172 described above. Specifically, the detection circuit 172 performs the discrimination related to the coupling state based on the voltage (the voltage V2 of the output transmission signal Sv2) of such a transmission signal.

Figures 10A, 10B, 10C, 10D:
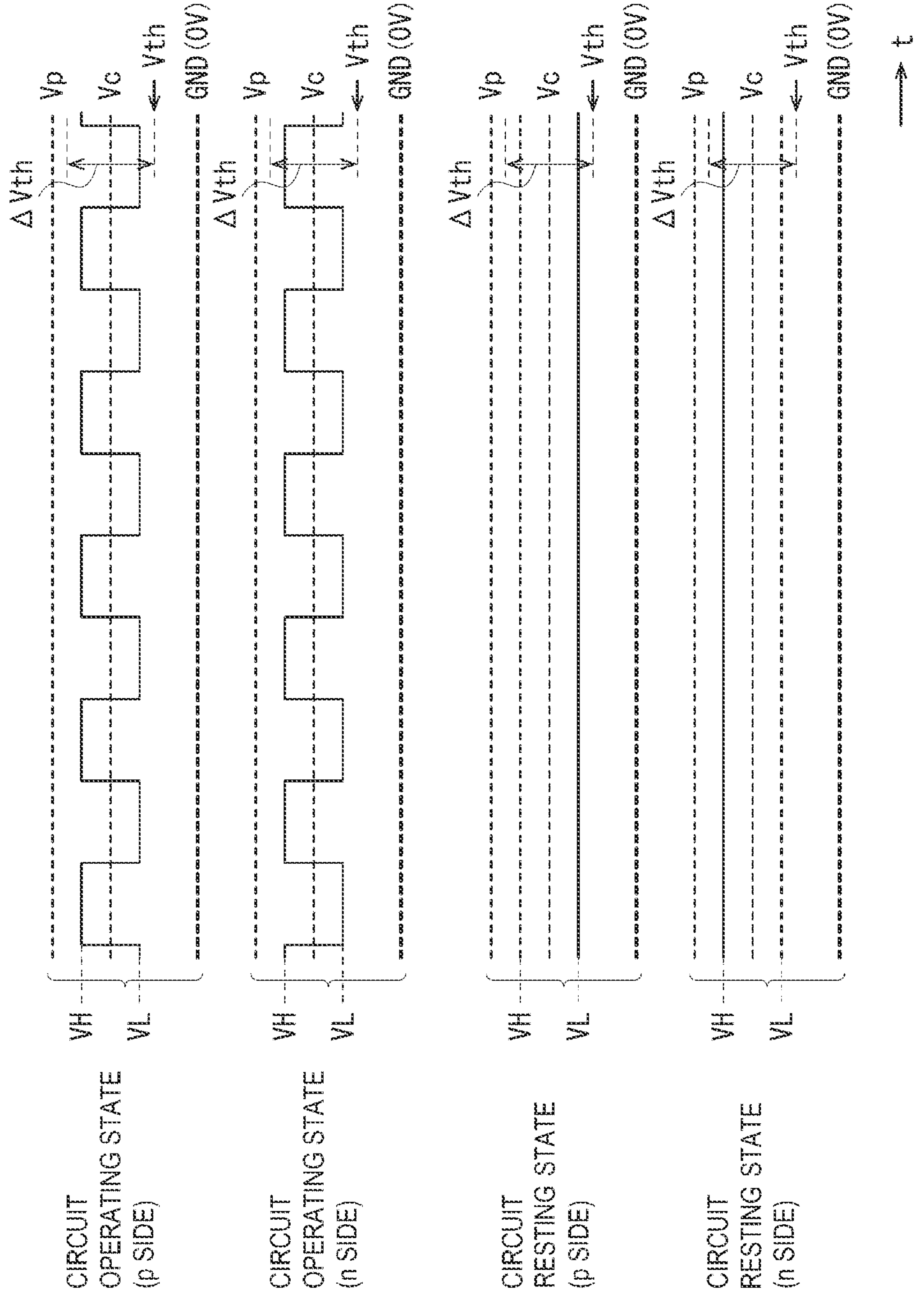
FIGS. 10A, 10B, 10C and 10D are a waveform chart for explaining an operation of detecting a coupling state according to the embodiment.

Here, FIG. 10A to FIG. 10D are a waveform chart (a diagram showing a waveform of the voltage V2 in the output transmission signal Sv2 described above) for describing the operation of detecting the coupling state according to the present embodiment. Specifically, FIG. 10A shows a waveform of the voltage V2 (the p side of the differential transmission) in a circuit operating state of a circuit (a circuit such as LVDS, CML, or ECL described above) to be used when performing the differential transmission. Further, FIG. 10B shows a waveform of the voltage V2 (the n side of the differential transmission) in such a circuit operating state. In contrast, FIG. 10C shows a waveform of the voltage V2 (the p side of the differential transmission) in a circuit resting state of such a circuit. Further, FIG. 10D shows a waveform of the voltage V2 (the n side of the differential transmission) in such a circuit resting state. It should be noted that the horizontal axis in FIG. 10A to FIG. 10D represents time t.

First, in a logic circuit such as a TTL (Transistor-Transistor-Logic) circuit or a CMOS (Complementary Metal Oxide Semiconductor) circuit in a typical single-ended transmission, a voltage (an H-level voltage VH) of a signal representing the "H" level of a signal generally becomes a voltage around the power supply voltage Vp. Further, a voltage (an L-level voltage VL) of a signal representing the "L" level of a signal generally becomes a voltage around the ground (GND: 0 V).

In contrast, when performing the differential transmission, as shown in, for example, FIG. 10A to FIG. 10D, the H-level voltage VH becomes lower than the power supply voltage Vp, and the L-level voltage VL becomes higher than GND (0 V). Further, between the H-level voltage VH and the L-level voltage VL described above, there exists the common-mode voltage Vc as shown in FIG. 10A to FIG. 10D. Further, when performing the differential transmission, it results in that a signal higher in voltage than the common-mode voltage Vc is determined as the "H" level, and a signal lower in voltage than the common-mode voltage Vc is determined as the "L" level. Specifically, in the case of, for example, LVDS, in one of the p side and then side, the common-mode voltage Vc=1.2 [V], approximately, the H-level voltage VH=1.375 [V], approximately, and the L-level voltage VL=1.025 [V], approximately.

Here, in the circuit operating state shown in FIG. 10A, FIG. 10B, the voltage V2 of the output transmission signal Sv2 becomes a pulse voltage alternately taking the H-level voltage VH and the L-level voltage VL. Further, the state of the p side shown in FIG. 10A and the state of the n side shown in FIG. 10B are always reversed in level of the output transmission signal Sv2 between the "H" level and the "L" level.

In contrast, since the circuit resting state shown in FIG. 10C and FIG. 10D is the state in which the differential transmission signal is not input, the voltage V2 of the output transmission signal Sv2 becomes as follows. That is, at the p side shown in FIG. 10C, the voltage V2 always becomes the L-level voltage VL, and at the n side shown in FIG. 10D, the voltage V2 always becomes the H-level voltage VH.

As described above, in any of the circuit operating state shown in FIG. 10A and FIG. 10B and the circuit resting state shown in FIG. 10C and FIG. 10D, the voltage V2 of the output transmission signal Sv2 fulfills (VL≤V2≤VH). Specifically, in the example of LVDS described above, (1.025 [V]≤V2≤1.375 [V]) is fulfilled.

It should be noted that when the coupling state in the coupling terminal part 130 is not normal, the voltage V2 of the output transmission signal Sv2 becomes lower than the L-level voltage VL (V2<VL), or higher than the H-level voltage VH (V2>VH). Specifically, when, for example, the electrical coupling is cut, the voltage becomes indefinite, and therefore, normally, the voltage V2=GND (0 V<VL) becomes true. Further, for example, due to a contact failure to the power supply and so on, the voltage V2=the power supply voltage Vp (>VH) is true in some cases.

With these factors, when determining whether or not the coupling state in the coupling terminal part 130 is normal, it is sufficient for the detection circuit 172 to determine whether or not the voltage V2 of the output transmission signal Sv2 is within the range of (VL≤V2≤VH). Specifically, in the example of LVDS described above, it results in that it is sufficient for the detection circuit 172 to determine whether or not (1.025 [V]≤V2≤1.375 [V]) is fulfilled.

More specifically, as shown in FIG. 7A, when the detection circuit 172 is configured including the comparator 172A, the following is achieved when described with the example of LVDS. That is, the comparator 172A determines whether or not the voltage V2 of the output transmission signal Sv2 is no lower than the threshold voltage Vth (e.g., Vth=0.9 [V]: see FIG. 10A to FIG. 10D) (V2≥0.9 [V]) around the common-mode voltage Vc (=1.2 [V]). Specifically, the comparator 172A determines that the coupling state in the coupling terminal part 130 is normal when (V2≥0.9 [V]) is true, and determines that the coupling state in the coupling terminal part 130 is not normal when (V2≤0.9 [V]) is true. It should be noted that in this case, when (V2>VH (=1.375 [V])) is true due to the contact failure with the power supply described above and so on, it is determined that the coupling state is not normal as a result.

In contrast, when the detection circuit 172 is configured including the AD converter 172B or the CPU with AD converter 172C as shown in FIG. 7B and FIG. 7C, such a problem is also solved. Specifically, the AD converter 172B or the CPU with AD converter 172C determines whether or not the voltage V2 of the output transmission signal Sv2 is within the voltage range ΔVth (e.g., ΔVth=0.9 [V] to 1.5 [V]: see FIG. 10A to FIG. 10D) around the common-mode voltage Vc. Specifically, when (0.9 [V]≤V2≤1.5 [V]) is true, it is determined that the coupling state in the coupling terminal part 130 is normal, and when (V2<0.9 [V]) is true, or when (V2>1.5 [V]) is true, it is determined that the coupling state in the coupling terminal part 130 is not normal. Therefore, in this case, when (V2>VH (=1.375 [V])) is true due to the contact failure with the power supply described above and so on, it is determined that the coupling state is not normal, and therefore, a more accurate determination becomes possible.

(B-3. Functions/Advantages)

In such a manner, in the inkjet head 1 according to the present embodiment, the coupling state in the coupling terminal part 130 is detected using the transmission signal in the differential transmission line used for the data transmission between the outside (the print control section 2) of the inkjet head 1 and the drive device 41, and therefore, the following is achieved.

That is, it becomes possible to detect the coupling state in the coupling terminal part 130 without separately arranging the dedicated terminals for detecting (confirming) the coupling state and so on as in, for example, the comparative examples (Comparative Example 1 and Comparative Example 3) described above. Thus, the dedicated terminals described above become unnecessary, and accordingly, a larger number of coupling terminals for the power supply lines and the ground lines which become necessary for ensuring the stable operation and the reliability in the inkjet head 1 can be arranged in the inkjet head 1. As a result, in the present embodiment, it becomes possible to enhance the reliability of the inkjet head 1.

Further, in particular in the present embodiment, since the coupling state described above is detected using the transmission signal (the output transmission signal Sv2) in the second differential transmission line Lt2 as the differential output line, the following is achieved. That is, it becomes possible to easily detect the coupling state (with a simplified method) compared to, for example, when detecting the coupling state using the transmission signal in the first differential transmission line Lt1 as the differential input line. As a result, it becomes possible to reduce the cost of the inkjet head 1.

Further, in the present embodiment, since the discrimination related to the coupling state is performed based on the voltage (the voltage V2 of the output transmission signal Sv2) of the transmission signal described above, the following is achieved. That is, it becomes possible to easily (with a simplified method) discriminate the coupling state compared to when performing the discrimination using other methods (e.g., an optical method). As a result, it becomes possible to further reduce the cost of the inkjet head 1.

In addition, in the present embodiment, since the discrimination related to the coupling state is performed using the common-mode voltage Vc which is always applied to the differential transmission line (the second differential transmission line Lt2 as the differential output line), the following is achieved. That is, it is possible to perform the discrimination related to the coupling state without using, for example, a special sequence for detecting the coupling. As a result, it becomes possible to further reduce the cost of the inkjet head 1.

Further, in the present embodiment, when arranging that the discrimination related to the coupling state is performed by comparing the voltage V2 of the output transmission signal Sv2 described above with the voltage range ΔVth around the common-mode voltage Vc in the AD converter 172B (or the CPU with AD converter 172C) included in the detection circuit 172 (in the case shown in FIG. 7B and FIG. 7C), the following is achieved. That is, since the variation when discriminating the abnormal voltage increases compared to when performing such discrimination (the case shown in FIG. 7A) by comparing the voltage V2 with, for example, the predetermined voltage (the threshold voltage Vth described above) around the common-mode voltage Vc, it is possible to reduce the erroneous discrimination of the abnormal voltage. As a result, it is possible to increase the discrimination accuracy related to the coupling state, and thus, it becomes possible to further enhance the reliability of the inkjet head 1.

Further, in the present embodiment, since the detection result (the coupling confirmation signal Sj) of the coupling state between each of the flexible boards 13*a* to 13*d* and the I/F board 12 in the coupling terminal part 130 is output from the detection circuit 172 arranged on the I/F board 12 to the outside (the print control section 2) of the inkjet head 1, the following is achieved. That is, it is possible to notify the outside of the detection result of the coupling state between the boards by the inkjet head 1 itself after, for example, the coupling operation between the I/F board 12 and each of the flexible boards 13*a* to 13*d* is performed by the user. As a result, it becomes possible to enhance the convenience.

In addition, in the present embodiment, the first input terminal Tin1 to which the first differential transmission line Lt1 as the differential input line is coupled is arranged at one end part side in the coupling terminal area Ac of the coupling terminal part 130. On the other hand, the second input terminal Tin2 to which the second differential transmission line Lt2 as the differential output line is coupled is arranged at the other end part side in such a coupling terminal area Ac. Thus, it becomes easy to detect the abnormal coupling state (e.g., the half-insertion state and the oblique insertion state described above) which can occur when the I/F board 12 and each of the flexible boards 13*a* to 13*d* are coupled to each other. As a result, it becomes possible to further enhance the reliability of the inkjet head 1.

2. Modified Example

Then, a modified example of the embodiment described above will be described. It should be noted that hereinafter, the same constituents as those in the embodiment are denoted by the same reference symbols, and the description thereof will arbitrarily be omitted.

[Configuration]

Figure 11:
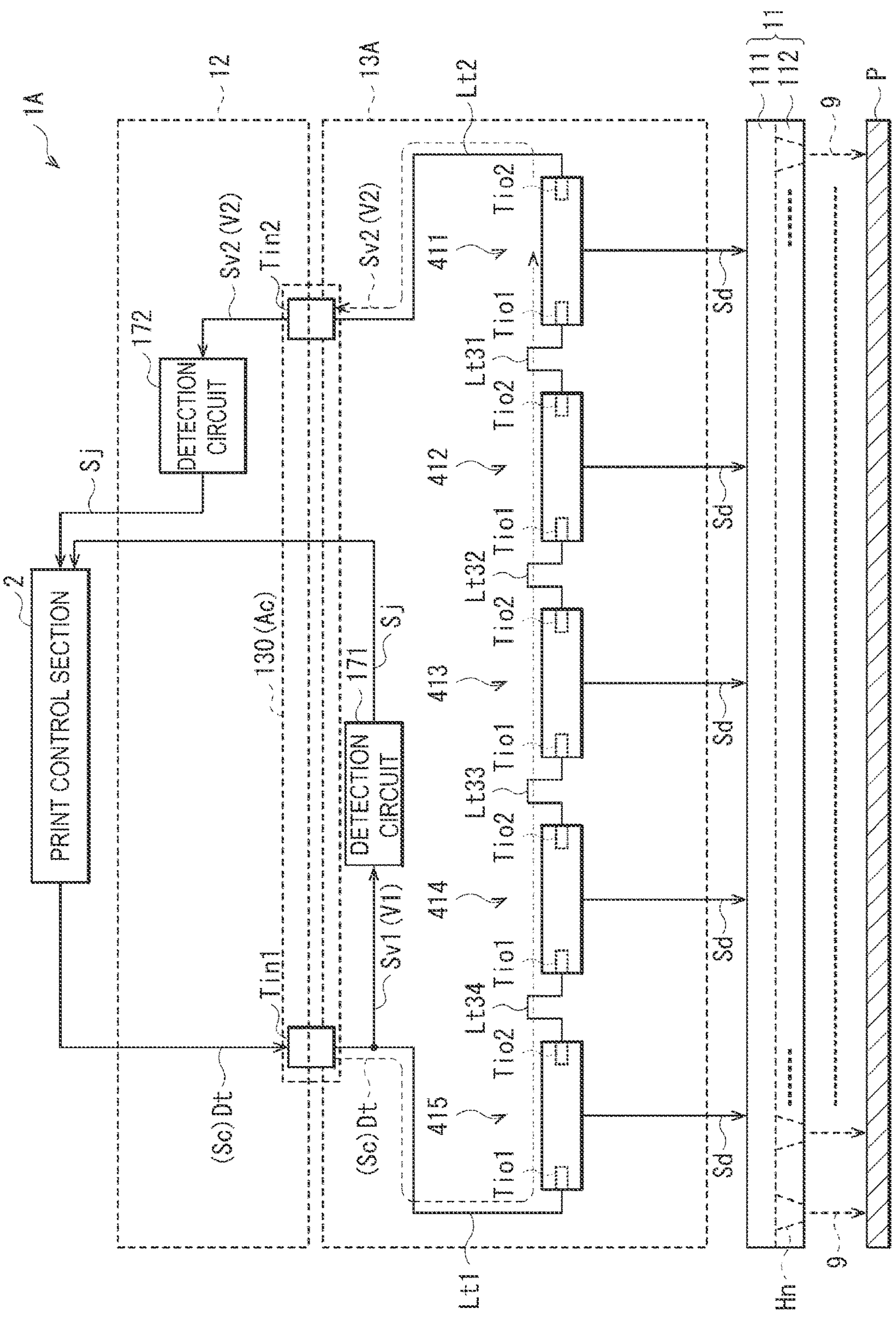
FIG. 11 is a schematic diagram showing an arrangement configuration example of members in a flexible board and so on in a liquid jet head according to a modified example.

FIG. 11 is a diagram schematically showing an arrangement configuration example of members in a flexible board 13A or the like in a liquid jet head (an inkjet head 1A) according to the modified example.

It should be noted that the inkjet head 1A corresponds to a specific example of the "liquid jet head" in the present disclosure. Further, a printer equipped with the inkjet head 1A corresponds to a specific example of the "liquid jet recording device" in the present disclosure.

First, in the inkjet head 1A according to the modified example shown in FIG. 11, the flexible board 13A is disposed instead of the flexible boards 13*a*, 13*c* in the inkjet head 1 according to the embodiment shown in FIG. 5, and the rest of the configuration is made basically the same.

The flexible board 13A is obtained by further disposing a detection circuit 171 in the flexible boards 13*a*, 13*c* shown in FIG. 5, and the rest of the configuration is made basically the same. In other words, in this inkjet head 1A, there are disposed two detection circuits 171, 172, namely the detection circuit 171 arranged on the flexible board 13A, and the detection circuit 172 arranged on the I/F board 12.

As shown in FIG. 11, the detection circuit 171 additionally arranged in the modified example performs the detection (confirmation) of the coupling state in the coupling terminal part 130 using a transmission signal (an input transmission signal Sv1) in the first differential transmission line Lt1 as the differential input line described above. Specifically, this detection circuit 171 is arranged to detect, for example, whether or not the I/F board 12 and the flexible board 13A are normally coupled to each other in the coupling terminal part 130, similarly to the detection circuit 172.

Further, the detection circuit 171 performs the discrimination related to the coupling state based on a voltage (a voltage V1 of the input transmission signal Sv1) of the transmission signal described above. Further, similarly to the detection circuit 172, the detection circuit 171 is arranged to output (see FIG. 11) the coupling confirmation signal Sj representing the detection result of the coupling state in the coupling terminal part 130 to the outside (the print control section 2) of the inkjet head 1.

In such a manner, in the inkjet head 1A, it is arranged that the coupling state in the coupling terminal part 130 is detected using the transmission signals (the output transmission signal Sv2 and the input transmission signal Sv1) in the both differential transmission lines, namely the differential output line (the second differential transmission line Lt2) and the differential input line (the first differential transmission line Lt1).

Here, the input transmission signal Sv1 described above corresponds to a specific example of a "transmission signal (in the differential input line)" in the present disclosure.

It should be noted that the detailed configuration example of the detection circuit 171 and the detailed example of the detection operation by the detection circuit 171 are each basically the same as in the case (see FIG. 7A to FIG. 7C, FIG. 10A to FIG. 10D, and so on) of the embodiment (the detection circuit 172 described above).

[Functions and Advantages]

In such a modified example, it also becomes possible to obtain basically the same advantages due to substantially the same function as that of the embodiment. In other words, similarly to the embodiment, in the modified example, it also becomes possible to enhance the reliability of the inkjet head 1A.

Further, in particular in this modified example, since the coupling state in the coupling terminal part 130 is detected using the transmission signals (the output transmission signal Sv2 and the input transmission signal Sv1) in the both differential transmission lines, namely the differential output line (the second differential transmission line Lt2) and the differential input line (the first differential transmission line Lt1), the following is achieved. That is, the detection accuracy of the coupling state increases compared to the case of the detection using only the transmission signal in one of these differential transmission lines as in, for example, the embodiment. As a result, compared to the embodiment and so on, in the modified example, it becomes possible to further enhance the reliability of the inkjet head 1A.

3. Other Modified Examples

The present disclosure is described hereinabove citing the embodiment and the modified example, but the present disclosure is not limited to the embodiment and so on, and a variety of modifications can be adopted.

For example, in the embodiment and so on described above, the description is presented specifically citing the configuration examples (the shapes, the arrangements, the number and so on) of each of the members in the printer 5 and the inkjet heads 1, 1A, but what is described in the above embodiment and so on is not a limitation, and it is possible to adopt other shapes, arrangements, numbers and so on.

Specifically, for example, in the embodiment and so on described above, the description is presented citing the operation of detecting the coupling state on the flexible boards 13*a*, 13*c* as an example, but it is possible to perform the operation of detecting the coupling state on the flexible boards 13*b*, 13*d* in basically the same manner. Specifically, in the embodiment and so on described above, there is described the example when the first differential transmission line Lt1 functions as the differential input line (the transmission data Dt is input from the first input terminal Tin1 side), and at the same time, the second differential transmission line Lt2 functions as the differential output line, but this example is not a limitation. Specifically, for example, when the second differential transmission line Lt2 functions as the differential input line (the transmission data Dt is input from a second input terminal Tin2 side), and at the same time, the first differential transmission line Lt1 functions as the differential output line, it is possible to perform the operation of detecting the coupling state in substantially the same manner as explained in the embodiment and so on described above.

Further, in the embodiment and so on described above, the description is presented specifically citing the configuration examples of the flexible board (the drive board), the drive device, the differential transmission line, the detection circuit, and so on, but these configuration examples are not limited to those described in the above embodiment and so on. For example, in the embodiment and so on described above, the description is presented citing when the "drive board" in the present disclosure is the flexible board as an example, but the "drive board" in the present disclosure can also be, for example, an inflexible board.

Further, the numerical examples of the variety of parameters (e.g., the numerical examples of the threshold voltage Vth, the voltage range ΔVth, the power supply voltage Vp, the common-mode voltage Vc, the H-level voltage VH, and the L-level voltage VL) explained in the embodiment and so on are not limited to the numerical examples explained in the embodiment and so on, and can also be other numerical values.

In addition, in the embodiment and so on described above, there is described the example when performing the detection of the coupling state in the coupling part using the transmission signal in the differential output line, or using the transmission signals in both of the differential output line and the differential input line, but these examples are not a limitation. Specifically, for example, it is possible to arrange to perform the detection of the coupling state using only the transmission signal in the differential input line. In other words, it is possible to perform the detection of the coupling state using the transmission signal in at least one of the differential output line and the differential input line.

Further, in the embodiment and so on described above, there is described the example when performing the discrimination related to the coupling state based on the voltage of such a transmission signal, but this example is not a limitation. Specifically, it is possible to arrange to perform the discrimination related to the coupling state based on, for example, a parameter (e.g., a current) other than the voltage in such a transmission signal.

Further, a variety of types of structures can be adopted as the structure of the inkjet head. Specifically, for example, it is possible to adopt a so-called side-shoot type inkjet head which emits the ink 9 from a central portion in the extending direction of each of the ejection channels in the actuator plate 111. Alternatively, it is possible to adopt, for example, a so-called edge-shoot type inkjet head for ejecting the ink 9 along the extending direction of each of the ejection channels. Further, the type of the printer is not limited to the type described in the embodiment and so on described above, and it is possible to apply a variety of types such as an MEMS (Micro Electro-Mechanical Systems) type.

Further, for example, it is possible to apply the present disclosure to either of an inkjet head of a circulation type which uses the ink 9 while circulating the ink 9 between the ink tank and the inkjet head, and an inkjet head of a non-circulation type which uses the ink 9 without circulating the ink 9.

Further, the series of processing described in the embodiment and so on described above can be arranged to be performed by hardware (a circuit), or can also be arranged to be performed by software (a program). When arranging that the series of processing is performed by the software, the software is constituted by a program group for making the computer perform the functions. The programs can be incorporated in advance in the computer described above to be used by the computer, for example, or can also be installed in the computer described above from a network or a recording medium to be used by the computer.

Further, in the embodiment and so on described above, the description is presented citing the printer 5 (the inkjet printer) as a specific example of the "liquid jet recording device" in the present disclosure, but this example is not a limitation, and it is also possible to apply the present disclosure to other devices than the inkjet printer. In other words, it is also possible to arrange that the "liquid jet head" (the inkjet head) of the present disclosure is applied to other devices than the inkjet printer. Specifically, it is also possible to arrange that the "liquid jet head" of the present disclosure is applied to a device such as a facsimile or an on-demand printer.

In addition, it is also possible to apply the variety of examples described hereinabove in arbitrary combination.

It should be noted that the advantages described in the present specification are illustrative only, but are not a limitation, and other advantages can also be provided.

Further, the present disclosure can also take the following configurations.

<1> A liquid jet head configured to jet liquid comprising: a jet section configured to jet the liquid; at least one drive circuit configured to output a drive signal used to jet the liquid to the jet section; a differential input line configured to transmit data from an outside of the liquid jet head toward the drive circuit; a differential output line configured to transmit data from the drive circuit toward the outside of the liquid jet head; a coupling part which is arranged between the outside of the liquid jet head and the drive circuit, and to which the differential input line and the differential output line are individually coupled; and a detection circuit configured to perform detection of a coupling state in the coupling part using a transmission signal in at least one of the differential output line and the differential input line.

<2> The liquid jet head according to <1>, wherein the detection circuit performs the detection of the coupling state using the transmission signal in the differential output line.

<3> The liquid jet head according to <2>, wherein the detection circuit performs the detection of the coupling state using the transmission signals in both of the differential output line and the differential input line.

<4> The liquid jet head according to any one of <1> to <3>, wherein the detection circuit performs discrimination related to the coupling state based on a voltage of the transmission signal.

<5> The liquid jet head according to <4>, wherein the detection circuit performs the discrimination related to the coupling state by comparing a voltage of the transmission signal with a voltage around a common-mode voltage.

<6> The liquid jet head according to <5>, wherein the detection circuit includes an AD (analog-digital) converter, and the AD converter performs the discrimination related to the coupling state by comparing the voltage of the transmission signal with a voltage range around the common-mode voltage.

<7> The liquid jet head according to any one of <1> to <6>, further comprising: a drive board on which the drive circuit is arranged, and which is electrically coupled to the jet section; and a relay board which is electrically coupled to the drive board via the coupling part, and which relays between the outside of the liquid jet head and the drive board, wherein the detection circuit which performs the detection of the coupling state using the transmission signal in the differential output line is arranged on the relay board, the detection circuit which performs the detection of the coupling state using the transmission signal in the differential input line is arranged on the drive board, and the detection circuit outputs a coupling confirmation signal representing a detection result of the coupling state between the drive board and the relay board in the coupling part to the outside of the liquid jet head.

<8> The liquid jet head according to <7>, wherein the coupling part has a coupling terminal area including a first terminal to which the differential input line is coupled and a second terminal to which the differential output line is coupled, the first terminal is arranged at one end part side in the coupling terminal area, and the second terminal is arranged at another end part side in the coupling terminal area.

<9> liquid jet recording device comprising the liquid jet head according to any one of <1> to <8>.

What is claimed is:

1. A liquid jet head configured to jet liquid comprising:
- a jet section configured to jet the liquid;
- at least one drive circuit configured to output a drive signal used to jet the liquid to the jet section;
- a differential input line configured to transmit data from an outside of the liquid jet head toward the drive circuit;
- a differential output line configured to transmit data from the drive circuit toward the outside of the liquid jet head;
- a coupling part which is arranged between the outside of the liquid jet head and the drive circuit, and to which the differential input line and the differential output line are individually coupled; and
- a detection circuit configured to perform detection of a coupling state in the coupling part using a transmission signal in at least one of the differential output line and the differential input line.

2. The liquid jet head according to claim 1, wherein
- the detection circuit performs the detection of the coupling state using the transmission signal in the differential output line.

3. The liquid jet head according to claim 2, wherein
- the detection circuit performs the detection of the coupling state using the transmission signals in both of the differential output line and the differential input line.

4. The liquid jet head according to claim 1, wherein
- the detection circuit performs discrimination related to the coupling state based on a voltage of the transmission signal.

5. The liquid jet head according to claim 4, wherein
- the detection circuit performs the discrimination related to the coupling state by comparing a voltage of the transmission signal with a voltage around a common-mode voltage.

6. The liquid jet head according to claim 5, wherein
- the detection circuit includes an AD (analog-digital) converter, and
- the AD converter performs the discrimination related to the coupling state by comparing the voltage of the transmission signal with a voltage range around the common-mode voltage.

7. The liquid jet head according to claim 1, further comprising:
- a drive board on which the drive circuit is arranged, and which is electrically coupled to the jet section; and
- a relay board which is electrically coupled to the drive board via the coupling part, and which relays between the outside of the liquid jet head and the drive board, wherein
- the detection circuit which performs the detection of the coupling state using the transmission signal in the differential output line is arranged on the relay board,
- the detection circuit which performs the detection of the coupling state using the transmission signal in the differential input line is arranged on the drive board, and
- the detection circuit outputs a coupling confirmation signal representing a detection result of the coupling state between the drive board and the relay board in the coupling part to the outside of the liquid jet head.

8. The liquid jet head according to claim 7, wherein
- the coupling part has a coupling terminal area including a first terminal to which the differential input line is coupled and a second terminal to which the differential output line is coupled,
- the first terminal is arranged at one end part side in the coupling terminal area, and
- the second terminal is arranged at another end part side in the coupling terminal area.

9. A liquid jet recording device comprising the liquid jet head according to claim 1.

* * * * *